UNITED STATES PATENT OFFICE.

HOWARD F. WEISS, OF MADISON, WISCONSIN, ASSIGNOR TO C. F. BURGESS LABORATORIES, OF MADISON, WISCONSIN, A CORPORATION OF WISCONSIN.

RECOVERY OF ORGANIC PRODUCTS FROM LARCH.

1,364,418. Specification of Letters Patent. Patented Jan. 4, 1921.

No Drawing. Application filed May 14, 1918. Serial No. 234,524.

*To all whom it may concern:*

Be it known that I, HOWARD F. WEISS, a citizen of the United States, residing at Madison, in the county of Dane, State of Wisconsin, have invented certain new and useful Improvements in the Recovery of Organic Products from Larch; and I do hereby declare the following to be a full, clear, and exact description of the invention, such as will enable others skilled in the art to which it appertains to make and use the same.

This invention relates to the production of paper pulp and waste liquor from the wood of the western larch; and more particularly to the production of an improved waste sulfite liquor of characteristic and distinctive composition and properties, and to the utilization of this liquor for various purposes.

The wood of the western larch contains a very large proportion of soluble constituents, principally galactan. The large amount of soluble and extractable matter correspondingly reduces the yield of pulp obtainable from the wood of the western larch, and, so far as I am aware, this wood has not heretofore been utilized for the production of sulfite pulp.

According to the present invention, the objections and disadvantages which would naturally be considered the result from the utilization of the western larch are availed of in a particularly advantageous manner.

According to the present invention, the wood of the western larch is first subjected to a chopping or other comminuting operation so that it is prepared in a mechanical form adapting it for the pulp-making operation. The resulting finely divided wood, either with or without the partial extraction of soluble constituents therefrom, is then subjected to the sulfite pulp process by adding to the finely divided wood the proper amount of so-called sulfite liquor, and by " digesting " the finely divided wood at the proper temperature and for a sufficient time to convert the wood into the form of pulp.

This pulp-making operation will be modified by the presence of the soluble constituents of the larch, principally galactan, and such soluble constituents will be extracted and will be present during the digestion and will be subjected to the action of the acid bi-sulfite liquor during the digestion operation.

As the result of this digestion, not only is the wood itself converted into the form of pulp, but it is subjected to an extraction operation with resulting extraction and solution of soluble constituents, including both the water-soluble constituents and those which are " dissolved " by the action of the bi-sulfite liquor. Moreover, the galactan and other dissolved constituents are subjected to the action of the acid liquor and are thereby, to a greater or less extent, hydrolyzed or converted into other constituents, such as galactose; so that, at the end of the digestion there is obtained a waste sulfite liquor so called, which has a modified composition due to the presence of the characteristic soluble constituents of the western larch and to the products of hydrolysis or conversion of these soluble constituents.

The amount of the waste sulfite liquor obtained from the western larch will be increased in amount as compared with the amount of waste liquor obtainable from the woods commonly used in the sulfite process; or, if the amount of liquor is the same, the liquor will be of increased content of dissolved constituents.

It is a matter of common knowledge that waste sulfite liquor is a waste product and that by far the greater part of the waste sulfite liquor produced is thrown away as a waste product. The common kinds of waste sulfite liquor contain a very small percentage of fermentable matter from which, by fermentation, a correspondingly small amount of alcohol may be produced. It has also been proposed to use the waste sulfite liquor for certain other purposes; but their chemical composition generally precludes their use except for purposes such as road binding material, adhesives, tanning, etc.

The waste sulfite liquor produced according to the present invention, while it may be used for such purposes as those just referred to, has a composition which makes it of particular value for certain purposes, because of its increased content of constituents obtainable from the western larch during the sulfite digestion process. Because of the high content of galactan or galactan conversion products, the waste liquor forms a valuable material for the production of alcohol, by fermentation. The waste sulfite liquor may be evaporated, and the concentrated liquor utilized as a syrup or in a solid form. The concentrated syrup may thus be used as a tanning material, and it forms a valuable tanning material because of its large content of galactan products. Upon fermentation of the waste liquor, or of the concentrated liquor, by suitable ferments, ethyl alcohol and citric acid may be obtained. The waste liquor, preferably after concentration, may thus be further treated with mineral acids or other oxidizing agents for the production therefrom of mucic acid, oxalic acid, etc.

Inasmuch as the waste liquor has an acid character, this acidity may be neutralized before the liquor is concentrated, or fermented, or otherwise treated. The neutralization may be effected by the addition of lime, or by a combination of different neutralization treatments, with which aeration or oxidation may be combined. After neutralization, suitable ferments may be added in case the liquor is to be fermented for the production of alcohol or citric acid; or the neutralized liquor may be evaporated and concentrated to produce a heavy extract or syrup suitable, for example, for tanning leather for core binders or for the production of other products therefrom.

Having thus described my invention, what I claim is:

1. The method of producing pulp, and of recovering valuable constituents from the wood of the western larch, which comprises chipping, shredding, or otherwise finely comminuting the wood, and subjecting the comminuted wood to digestion with sulfite liquor and thereby producing sulfite pulp and a waste liquor containing the soluble constituents of the larch and the products of conversion including products of conversion of galactan produced therefrom during the digestion.

2. Waste sulfite liquor produced from the wood of the western larch and containing the characteristic soluble constituents of the western larch and the products produced therefrom during the sulfite digestion including products produced from the galactan content of the larch.

3. A concentrated waste sulfite liquor produced from the wood of the western larch, said liquor containing the characteristic soluble constituents of the wood of the western larch and the products of conversion thereof produced during the sulfite digestion including products produced from the galactan content of the larch.

4. The method of producing alcohol, citric acid, etc., which comprises subjecting the wood of the western larch to a sulfite digestion, recovering the waste sulfite liquor from the digestion, neutralizing the liquor and subjecting it to a fermentation operation.

In testimony whereof I affix my signature.

HOWARD F. WEISS.